US 7,887,615 B2

(12) United States Patent
Spindler et al.

(10) Patent No.: US 7,887,615 B2
(45) Date of Patent: Feb. 15, 2011

(54) METHOD AND DEVICE FOR PRODUCING NITROGEN FERTILIZER FROM ORGANIC WASTE PRODUCTS

(75) Inventors: Herbert Spindler, Halle (DE); Ute Bauermeister, Leipzig (DE); Thomas Meier, Berlin (DE); Michael Teske, Schkopau (DE)

(73) Assignee: Phoenix Beteiligungs GmbH, Schwarzach (AT)

( * ) Notice: Subject to any disclaimer, the term of this patent is extended or adjusted under 35 U.S.C. 154(b) by 851 days.

(21) Appl. No.: 10/579,576

(22) PCT Filed: Nov. 15, 2004

(86) PCT No.: PCT/EP2004/013034
§ 371 (c)(1),
(2), (4) Date: May 17, 2006

(87) PCT Pub. No.: WO2005/049495
PCT Pub. Date: Jun. 2, 2005

(65) Prior Publication Data
US 2007/0062231 A1    Mar. 22, 2007

(30) Foreign Application Priority Data
Nov. 19, 2003   (DE) .................................. 103 54 063
Nov. 4, 2004    (DE) ....................... 10 2004 053 297

(51) Int. Cl.
*C05D 9/02*     (2006.01)
*C05F 11/00*    (2006.01)
*C05F 1/00*     (2006.01)
*C05F 3/00*     (2006.01)
*A01N 25/00*    (2006.01)

(52) U.S. Cl. .................. 71/11; 71/15; 71/21; 71/64.01
(58) Field of Classification Search .................. 71/7–26, 71/64.01–64.13
See application file for complete search history.

(56) References Cited

U.S. PATENT DOCUMENTS 4,076,515 A    2/1978   Rickard
(Continued)

FOREIGN PATENT DOCUMENTS

DE      36 03 739 A1     8/1986
DE         360379 C2     8/1986
DE      195 47 320 A1    6/1997

OTHER PUBLICATIONS

International Preliminary Report dated Jan. 12, 2006 for related PCT application.

*Primary Examiner*—Jerry Lorengo
*Assistant Examiner*—Jennifer A Smith
(74) *Attorney, Agent, or Firm*—Husch Blackwell LLP

(57) ABSTRACT

The invention relates to a method and a device for producing nitrogen fertilizer from organic waste products in the liquid phase (suspension, emulsion, solution) and for hygienizing the wastes or reducing the emissions by thermal treatment using mineral or organic additions.

Figure 1:
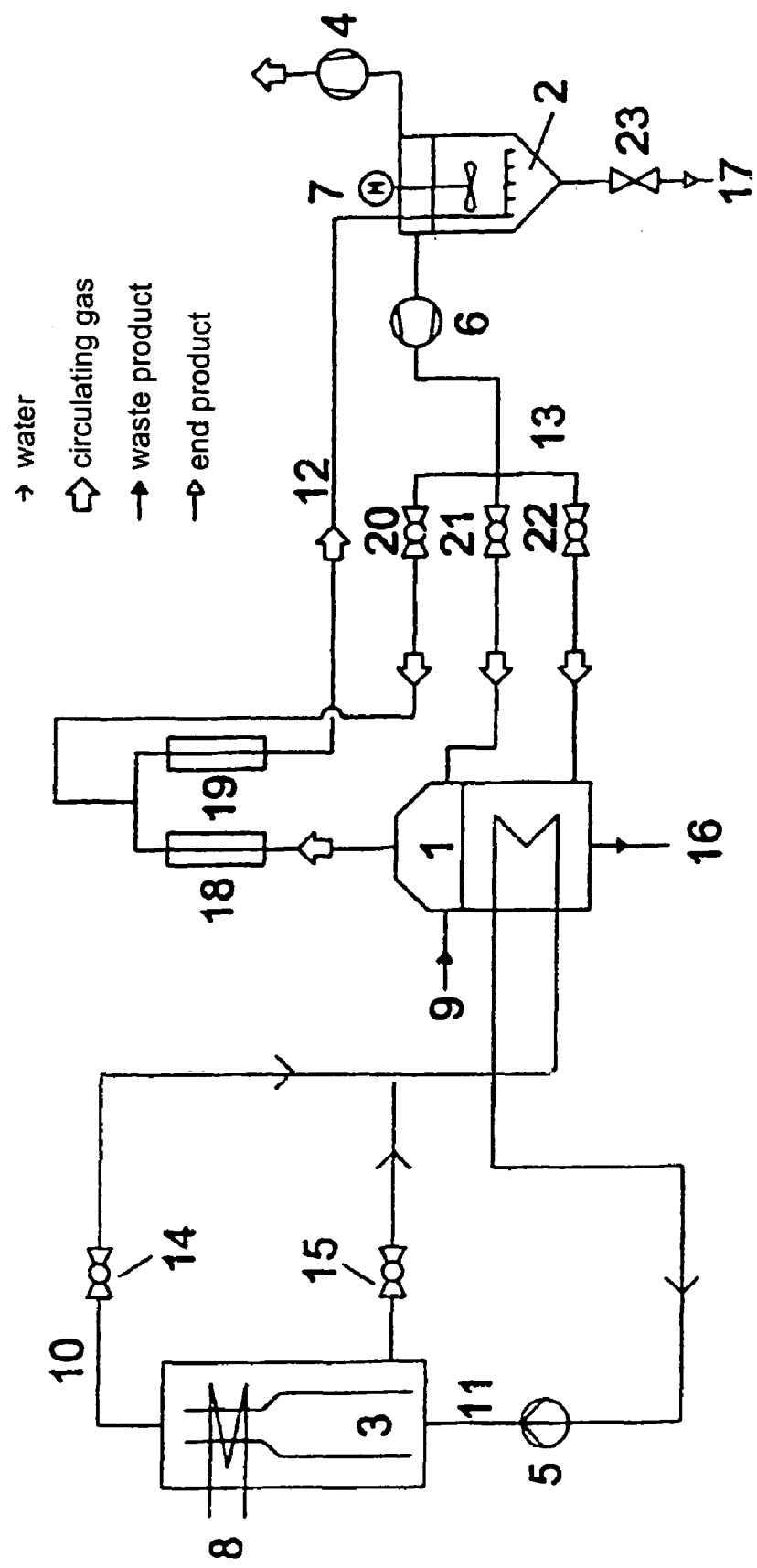

According to the invention, this is achieved by a method, wherein the waste product is heated at underpressure to temperatures between 40 and 90° C., the escaping gas containing carbon dioxide and ammonia is cooled down and introduced into an aqueous absorption agent, the nitrogen fertilizer formed thereby is discharged and the excess gas not having been absorbed and containing carbon dioxide is pumped back into the discharge container, wherein the underpressure generated at the beginning of the process by a vacuum pump is autogenously maintained by the progress of the process.

Suitably, the return of the excess gas into the cycle is performed by either conducting it immediately above the waste product to be treated, or through a gas cooling system above the waste product to be treated, or dividing it and conducting a partial flow through the waste product and another partial flow above the waste product.

Preferably, a gypsum suspension is used as an aqueous absorption agent.

7 Claims, 2 Drawing Sheets scheme of the device for producing nitrogen fertilizer

U.S. PATENT DOCUMENTS 5,415,681 A * 5/1995 Baker .......................... 95/45
6,368,849 B1   4/2002 Norddahl
6,464,875 B1 * 10/2002 Woodruff .................... 210/603

* cited by examiner scheme of the device for producing nitrogen fertilizer special device for producing nitrogen fertilizer

METHOD AND DEVICE FOR PRODUCING NITROGEN FERTILIZER FROM ORGANIC WASTE PRODUCTS

The invention relates to a method and a device for producing nitrogen fertilizer from organic waste products in the liquid phase (suspension, emulsion, solution) and for hygienizing the wastes or reducing the emissions by thermal treatment using mineral or organic additions.

Numerous methods for producing fertilizers from organic wastes such as fresh or fermented manure, animal feces, muck, droppings or sewage sludge are known in the art, which are directed to the production of the fertilizer as well as to the hygienization of the initial products and the reduction of foul-smelling substances and harmful greenhouse gases, in particular ammonia.

For instance, DE 196 30 387 A1 and DE 101 20 372 A1 describe methods for producing a fertilizer from manure with a considerably reduced release of ammonia, based on the chemical reaction of manure with humus.

DE 43 04 342 C1 proposes a method for producing a fertilizer on the basis of sewage sludge by mixing with calcium sulfate. In DE 41 19 504 A1 is disclosed a method for producing a combination fertilizer by mixing manure and/or feces with gypsum. According to DE 44 44 726 C1, a fertilizer is obtained by mixing manure with finely ground fire clay and solidifying the resulting product. In DE 196 44 613 C2, a pellet-type fertilizer from manure using CaO-containing residues from flue gas cleaning devices is proposed.

Further, methods such as in DE 40 33 509 A1 are known in the art, according to which liquid organic fertilizers and condenser water are mixed with biogenic substances such as straw and mineral substances such as gypsum so to obtain a fertilizer ready to spread, and are then subjected to a thermal re-treatment at 70 to 80° C.

In DE 195 47 320 A1, a method and a device for producing an ammonia-free and sterile all-in-one fertilizer from biological wastes is described, wherein the fermented material is heated for at least 1 hour to the boiling temperature, and the released ammonia and other volatile substances are removed together with the vapor. According to DE 42 43 918 A1, the fermented manure is boiled in a column, and the escaping ammonia-containing vapors are condensed in a mixing condenser with formation of ammonium salts.

All these methods are uneconomical and fulfill the objects of the method according to the invention to an incomplete extent only. The methods, which result in a fertilizer by mixing the waste products with additions, have to dry and finish the fertilizer in an expensive way. Those methods, which drive ammonia in the boiling heat out, must solve the not simple object of condensation and water removal.

It is the object of the present invention to reduce the emissions of organic wastes, for instance manure, with the simultaneous production of a high-quality nitrogen fertilizer and the conversion of the discharges, in particular in biogas systems, into an environmentally friendly, hygienically harmless sludge liquor by an economical and technically simple method.

CONCISE DESCRIPTION OF THE DRAWINGS

Figure 2:
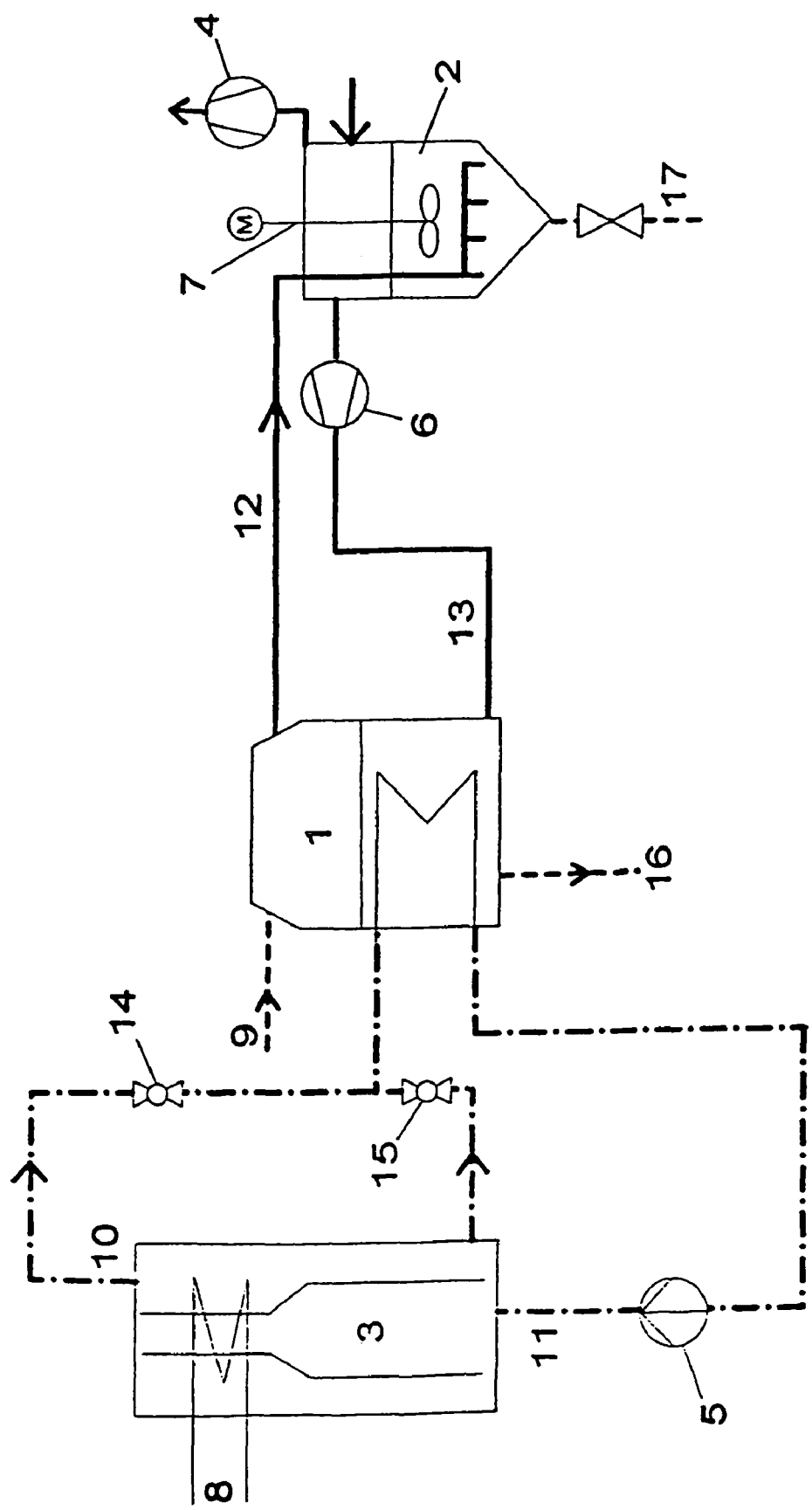

FIG. 1 shows a flowchart of the subject invention for producing nitrogen fertilizer; and FIG. 2 shows a flowchart for an alternative embodiment of the subject invention for producing nitrogen fertilizer.

DETAILED DESCRIPTION OF THE SEVERAL EMBODIMENTS OF THE SUBJECT INVENTION

According to the invention, this is achieved by a method using organic waste products in the liquid phase (suspension, emulsion, solution) by thermal treatment using mineral or organic additions, wherein the waste product is heated at underpressure to temperatures between 40 and 90° C., the escaping gas containing carbon dioxide and ammonia is cooled down and introduced into an aqueous absorption agent or brought into contact therewith, the nitrogen fertilizer formed thereby is discharged and the excess gas not having been absorbed and containing carbon dioxide is pumped back into the discharge container, wherein the underpressure generated at the beginning of the process by a vacuum pump is autogenously maintained by the progress of the process.

Preferably, the excess gas not having been absorbed and containing carbon dioxide is pumped back into the cycle by either
- conducting it through the waste product to be treated, or immediately above the waste product to be treated, or
- through the gas cooling system above the waste product to be treated, or
- dividing it and conducting a partial flow through the waste product and another partial flow above the waste product.

Suitably, a temperature is adjusted in the gas cooling system, which is at least 3 K and at most 15 K below the temperature in the stripping container, whereas in the rear part another cooling-down process to 40° C. takes place.

It may be advantageous to add in addition carbon dioxide in a mixture with other gases, for instance from biogas plants, from outside to the excess gas conducted in the cycle.

It is advantageous to select a pressure of 10 to 70 kPa.

It has proven advantageous to first evacuate to 10 to 30 kPa, and to then increase the pressure to 40 to 80 kPa.

Further, it has turned out that the method is preferably suited for the treatment of animal excrements, such as manure and feces, in the liquid phase, without being limited thereto. The effect can also be transferred to further organic waste products, such as liquid muck and nitrogen-containing liquid wastes.

It has turned out as particularly advantageous, if fermented manure is used, to heat it up to 70 to 85° C. at a reduced pressure.

In this case, it may be advantageous to filter the fermented manure before its thermal vacuum treatment. The hygienized discharge manure remaining after the thermal treatment can then be sprayed on meadows and fields as a virtually odorless sludge liquor stripped from nitrogen compounds. The solid substances separated by the filtration are well compostable.

A particularly suitable aqueous absorption agent is a gypsum suspension in water having a content of solid matter of 10% by mass to 50% by mass. It is favorable to stir this suspension and regularly remove the generated nitrogen fertilizer containing deposited lime and ammonium sulfate at the sump of the container. The fertilizer can immediately be used either as a thin mud or also after drying as a crumbly mass or as a powder, or can be stored for later use.

In a preferred embodiment, the method according to the invention combines a degasification of the wastes in a vacuum with a chemical reaction of the escaping gasses in a suspension of a finely ground mineral mass. Unexpectedly, the following surprising effect has been found: if the atmospheric pressure in a container filled with fresh or fermented manure of liquid muck is reduced with simultaneous moderate heating to 40 to 90° C., then first carbon dioxide, and at a slightly higher temperature ammonia will escape from the liquid, without being accompanied by appreciable amounts of water. When these gases are conducted into a suspension of a finely ground mineral mass containing calcium compounds, they will react under generation of lime and ammonium salts, but in a way that the underpressure is maintained, and the reaction is autogenously continued, if the temperature in the discharge container is maintained at the predetermined level.

In this way, the ammonium nitrogen e.g. from a fermented manure can nearly fully be removed. A virtually odorless sludge liquor is left, which does not gas anymore, but still contains the mineral components of the manure, such as potassium and phosphate, in the form of its compounds. From the stirred suspension in the collector, the ready-to-use nitrogen fertilizer containing lime in addition to ammonium salts, can be taken out as a concentrated suspension. It can be used without any further re-treatment.

Since the gases fed into the collection container are not fully absorbed by the aqueous mineral suspension, they are returned into the stripping container and thus guided in a circulating course.

An acid solution, in particular a sulfate solution, is also suitable as an aqueous absorption product. Further, of course, a combination with a gypsum suspension in water is a suitable variant.

A clearly better result is obtained, if the gases fed into the collection container are returned to the stripping container and thus guided in a circulating course. This circulating course of the excess gas is an essential feature of the invention.

The device is composed of the following essential parts:
a stripping container for heating at underpressure (1)
a collection container for a reaction in a heterogeneous phase (2)
a heat storage (thermosiphon) for heat exchange (3)
a vacuum pump (4)
a heating water pump (5)
a circulation fan (6)
a stirrer (7)
and per se known pipelines, shutoff devices, and measurement and control devices.

A preferred embodiment of the device for producing nitrogen fertilizer consists in that
the device comprises an additional gas cooling system with an upwards directed separating column and a downwards directed cooler, and
additional pipelines and ball valves, in order that the circulating gas
can be fed fully or partially into the stripping container above the waste product or
through the cooling system into the collection container or
partially into the stripping container into the waste product, wherein the residual flows in case of a division of the circulating gas are optionally fed into the two remaining designated entry positions.

The method and the device are characterized by low investment and operating costs and prevent risks for man and environment. The method has a minimum current consumption, since the underpressure in the system is maintained, once it has been generated by the vacuum pump. The necessary process heat is substantially secured by the waste heat of a block heat and power plant of the biogas system connected upstreams. Further chemicals such as acids or alkalis are not needed in the preferred embodiment of the invention. The system required for the method is easy to handle and can be operated as a batch process, but also continuously.

The invention is described in more detail by the following examples, and the device required therefor is explained by reference to three preferred variants (in Example 1) and two special cases (in Examples 2 and 3), without being limited thereto.

EXAMPLES

Example 1

FIG. 1 shows in an exemplary manner the scheme of such a device for producing nitrogen fertilizer, as described in Example 1 in more detail.

Therein are:

| | |
|---|---|
| 1 | stripping container for heating at underpressure |
| 2 | collection container for a reaction in the heterogeneous phase |
| 3 | heat storage (thermosiphon) for heat exchange |
| 4 | vacuum pump |
| 5 | heating water pump |
| 6 | circulation fan |
| 7 | stirrer |
| 8 | heat exchanger |
| 9 | inlet of discharge |
| 10 | outlet of heating water |
| 11 | return line for heating water |
| 12 | line for stripping gas |
| 13 | line for return gas |
| 14 | ball valve |
| 15 | ball valve |
| 16 | discharge residue |
| 17 | discharge nitrogen fertilizer |
| 18 | upwards directed part of the cooling system (separation column) |
| 19 | downwards directed part of the cooling system (cooler) |
| 20-22 | ball valves for return gas |
| 23 | shutoff valve |

The system selected as Example 1 operates as a batch process. The heat exchanger (3), which is configured in an exemplary manner as a layer-type storage container (thermosiphon), serves for the intermediate storage of the heat of the treated discharge for heating-up the freshly poured-in liquid waste product, in the example 250 liters fermented manure (discharge) were used. The water in the heat storage is pre-heated by treated discharge and re-heated by the waste heat of a block heat and power plant over the heat exchanger (8), so that there is continuously a temperature of 90° C. at the storage head.

Start-Up of the Batch Process

The fresh discharge is poured into the stripping container (1) at position (9). After closing the container, heating-up is performed by means of heating water, which is taken up at position (10) directly at the head of the layer-type storage container, to a temperature of approx. 80° C. The return flow of the heating water is fed again to the heat exchanger (3) through the line (11) by means of the heating water pump (5), and thus introduced again in the respective temperature zone.

After reaching the operating temperature, a pressure of 40 kPa is adjusted in the whole system by a controlled vacuum pump (4), and the pressure reduction is performed slowly and steadily. When this pressure has been obtained, the circulation fan (6) is set into operation, so that the stripping gas is sucked-off with a defined gas throughput from the stripping container (1) through the line (12), and return gas from the collection container (2) is fed to the stripping process through the line (13), and by means of the ball valves 20 to 22, three preferred variants of the circulation gas flow according to the invention can be selected:

Variant A: ball valve 21 is opened, whereas 20 and 22 remain closed. Then the circulation gas flows completely above the level of the waste product into the stripping container (1).

Variant B: ball valve 21 remains closed, and ball valves 20 and 22 are partially opened, so that part of the circulation gas flows through the waste product, whereas the remainder is returned between the column (3) and the cooler (4) into the process.

Variant C: ball valve 20 is opened, and ball valves 21 and 22 remain closed. Then the circulation gas completely flows back into the process at the indicated center of the cooling system.

Operating Sequences of the Batch Process

During the batch process, temperature and pressure in the stripping container (1) are held at approx. 80° C. and 40 to 50 kPa by switching the heating water pump (5) or the vacuum pump (4) on and off.

Under these conditions, in the course of approx. 2 hours, first $CO_2$ and then ammonia are driven out from the discharge, reacted in the circulation process and washed-out in the following collector.

With the finely grained mineral mass being present there, for instance gypsum, the reaction products are reacted so to form lime and ammonium sulfate, and the undissolved mineral mass and lime particles are held in suspension by the stirrer (7). The stirring speed is to be selected such that no blocking of the inlets and outlets by the deposited lime occurs.

The mass of the driven-out ammonia is approx. 850 g per batch process. This mass reacts with approx. 3.4 kg gypsum, which has been suspended before in 10 l collection water.

As reaction products are generated approx. 2.5 kg lime and 3.3 kg ammonium sulfate in the liquid phase. Both substances can be used as a fertilizer without any further re-treatment.

Completion of the Batch Process

After degassing the ammonia as far as possible from the discharge, the gas circulation driven by the circulation fan is set out of operation. The system is aerated.

Cooling-down of the treated discharge takes place, by closing the ball valve (14) and opening the ball valve (15) in the heating cycle, by conducting now cold storage water taken from the lower part of the heat storage through the heat exchanger of the stripping container. In this way, the heat of the treated discharge is transferred to the cold storage water. The heated-up storage water is in turn fed to the storage through the thermosiphon and introduced in the respective temperature zone into the heat storage.

After cooling-down of the treated discharge, the stripping container is emptied at the position (16) and is available for the next filling-up. After every batch process (before the new generation of vacuum for the next process), the sump is discharged at position (19) through the valve (23) from the collection container, and a new gypsum suspension is introduced.

Example 2

The invention may also be carried out by the special case described in more detail in this Example 2, this case having the advantage of a slightly easier and faster execution, not being suitable, however, for all applications in an optimum manner.

FIG. 2 shows in an exemplary manner the scheme of such a special device for producing nitrogen fertilizer.

There are:

| Full line: | gas circulation |
| Dotdashed line: | heating water circulation |
| Dashed line: | flows of substances |

| 1 | stripping container for heating at underpressure |
| 2 | collection container for the reaction in the heterogeneous phase |
| 3 | heat storage (thermosiphon) for heat exchange |
| 4 | vacuum pump |
| 5 | heating water pump |
| 6 | circulation fan |
| 7 | stirrer |
| 8 | heat exchanger |
| 9 | inlet of discharge |
| 10 | outlet of heating water |
| 11 | return line for heating water |
| 12 | line for stripping gas |
| 13 | line for return gas |
| 14 | ball valve |
| 15 | ball valve |
| 16 | discharge residue |
| 17 | discharge nitrogen fertilizer |

The system of Example 2 shown as a special case again operates as a batch process. The heat storage (3), which is configured in an exemplary manner as a layer-type storage container (thermosiphon), serves for the intermediate storage of the heat of the treated discharge for heating-up the freshly poured-in liquid waste product. In the example, 250 liters fermented manure (discharge) were used. The water in the heat storage is preheated by the treated discharge and re-heated by the waste heat of a block heat and power plant over the heat exchanger (8), so that there is continuously a temperature of 90° C. at the storage head.

Start-up, operating sequences and completion of the batch process take place in an analogous manner to Example 1.

Example 3

This method is again carried out in a batch process according to the scheme shown in Example 1, however with the modifications described below.

The fresh discharge is poured into the stripping container (1) at position (9). After closing the container, heating-up is performed by means of heating water, which is taken up at position (10) immediately at the head of the heat storage container (3), to a temperature of 70 to 75° C. The return flow of the heating water is fed again to the heat storage (3) through the line (11) by means of the heating water pump (5), and thus introduced again in the respective temperature zone.

Before reaching the operating temperature, a pressure of >400 mbar is adjusted in the whole system by a controlled vacuum pump (4). After reaching the final pressure, the circulation fan (6) is set into operation, so that the stripping gas is sucked-off with a defined gas throughput from the stripping container (1) through the cooled line (12), and return gas from the collection container (2) is fed to the stripping container through the line (13).

During the batch process, the temperature in the stripping container (1) is held constant at approx. 75 to 80° C. by switching the heating water pump (5) on and off, whereas the pressure slowly rises to 400 to 500 mbar.

Under these conditions, in the course of approx. 2 hours, first $CO_2$ and then ammonia are driven out from the discharge and washed-out in the following collector. In the collector, there is a suspension of 2.75 kg FDG gypsum in 8 liters water, which has been reacted with 2 μliters of a 20% sulfuric acid. The mass of the driven-out ammonia is approx. 850 g per batch process. As reaction products are generated approx. 2 kg lime and 3.3 kg ammonium sulfate in the liquid phase. Both substances can be used as a fertilizer without any further re-treatment.

The undissolved mineral mass and lime particles are held in suspension by the stirrer (7). The stirring speed is to be selected such that no blocking of the inlets and outlets by the deposited lime occurs.

The invention claimed is:

1. A method for producing nitrogen fertilizer from organic waste products in the liquid phase and for hygienizing the wastes and reducing emissions by thermal treatment using mineral or organic additions, wherein the waste product is heated in a first vessel without acids or alkali to temperatures between 40 and 90° C., as the pressure is first evacuated to 10 to 30 kPa, and then the pressure is increased to 40 to 80 kPa, so as to remove carbon dioxide and almost all ammonia without being accompanied by appreciable amounts of water, wherein the escaping gas containing carbon dioxide and ammonia is cooled down and then introduced into a second vessel, to an aqueous absorption agent, or brought into contact therewith, the nitrogen fertilizer formed thereby is discharged into a container and the excess gas not having been absorbed and containing carbon dioxide is conducted back into the process and circulated between the first and the second vessel, whereby the temperature of the discharge container is maintained at a predetermined value such that the underpressure between 10 and 80 kPa generated at the beginning of the process by a vacuum pump is autogenously maintained by the progress of the process, and the ammonium nitrogen fertilizer may be nearly fully removed.

2. The method according to claim 1, wherein the excess gas containing carbon dioxide is not absorbed and is conducted back into the cycle by either
   conducting it through the waste product to be treated, or
   conducting it immediately above the waste product to be treated, or
   conducting it through a gas cooling system above the waste product to be treated, or dividing it and conducting a partial flow through the waste product and another partial flow above the waste product.

3. The method according to claim 1, wherein a temperature is adjusted in the front portion of the gas cooling system, which is at least 3 K and at most 15 K below the temperature in the first vessel, whereas in the second vessel another cooling-down process to 40° C. takes place.

4. The method according to claim 1, wherein carbon dioxide in a mixture with other gases is added to the excess gas.

5. The method according to claim 1, wherein fermented manure is used as waste product and the fermented manure is heated to 70 to 85° C. at a reduced pressure.

6. The method according to claim 5, including the step of filtering the fermented manure before a thermal vacuum treatment, and spraying the hygienized discharge manure formed after the thermal vacuum treatment onto meadows and fields as a virtually odorless sludge liquor stripped from nitrogen compounds, and composting the solid substances separated after filtration.

7. The method according to claim 1, characterized by using as said aqueous absorption agent, a sulfate solution and/or a gypsum suspension having a content of solid matter of 10% by mass to 50% by mass, wherein the latter is stirred in a collection container, and the product containing deposited lime and ammonium sulfate is taken out from the container.

* * * * *